(12) United States Patent
Kerby

(10) Patent No.: US 9,077,767 B2
(45) Date of Patent: Jul. 7, 2015

(54) INCEPTION OF LIVE EVENTS

(76) Inventor: Eric James Kerby, Terrace (CA)

( * ) Notice: Subject to any disclaimer, the term of this patent is extended or adjusted under 35 U.S.C. 154(b) by 326 days.

(21) Appl. No.: 13/583,063

(22) PCT Filed: Mar. 22, 2011

(86) PCT No.: PCT/IB2011/051203
§ 371 (c)(1),
(2), (4) Date: Sep. 6, 2012

(87) PCT Pub. No.: WO2011/121486
PCT Pub. Date: Oct. 6, 2011

(65) Prior Publication Data
US 2013/0013550 A1    Jan. 10, 2013

Related U.S. Application Data

(60) Provisional application No. 61/318,764, filed on Mar. 29, 2010.

(51) Int. Cl.
*H04L 29/08* (2006.01)
*G06N 5/04* (2006.01)
*G06Q 10/10* (2012.01)

(52) U.S. Cl.
CPC .............. *H04L 67/306* (2013.01); *G06N 5/048* (2013.01); *G06Q 10/10* (2013.01)

(58) Field of Classification Search
None
See application file for complete search history.

(56) References Cited

U.S. PATENT DOCUMENTS

| 7,890,871 | B2 | 2/2011 | Etkin | |
|---|---|---|---|---|
| 2002/0123924 | A1 | 9/2002 | Cruz | |
| 2005/0033615 | A1 | 2/2005 | Nguyen | |
| 2006/0048059 | A1 | 3/2006 | Etkin | |
| 2006/0277130 | A1 | 12/2006 | Harmon | |
| 2007/0060328 | A1 | 3/2007 | Zrike | |
| 2007/0179792 | A1 | 8/2007 | Kramer | |
| 2008/0046913 | A1 | 2/2008 | Dear | |
| 2008/0215623 | A1 | 9/2008 | Ramer | |
| 2008/0222535 | A1 | 9/2008 | Zrike | |
| 2008/0306826 | A1 | 12/2008 | Kramer | |
| 2009/0006458 | A1 | 1/2009 | Stivoric | |
| 2009/0265246 | A1 | 10/2009 | Nelson | |
| 2009/0307234 | A1 | 12/2009 | Zrike | |
| 2009/0319288 | A1 * | 12/2009 | Slaney et al. | 705/1 |
| 2010/0017371 | A1 | 1/2010 | Whalin | |
| 2010/0241498 | A1 * | 9/2010 | Chung et al. | 705/14.5 |
| 2011/0004501 | A1 * | 1/2011 | Pradhan et al. | 705/8 |

FOREIGN PATENT DOCUMENTS

| JP | 2002-109414 | 4/2002 |
|---|---|---|
| WO | 2007033358 | 3/2007 |
| WO | 2008030729 | 3/2008 |
| WO | 20110121486 | 10/2011 |

* cited by examiner

*Primary Examiner* — Kakali Chaki
*Assistant Examiner* — Mai T Tran
(74) *Attorney, Agent, or Firm* — John R. Flanagan

(57) ABSTRACT

Common interests of at least two different groups of users are captured and analyzed to create a proposal for an event that would satisfy the interests of each group of users. One group of users may be consumers of content, another group of users may be providers of content and a further group of users may, for example, be venue providers. Once an event is proposed, ownership of the event may be prompted for.

18 Claims, 6 Drawing Sheets

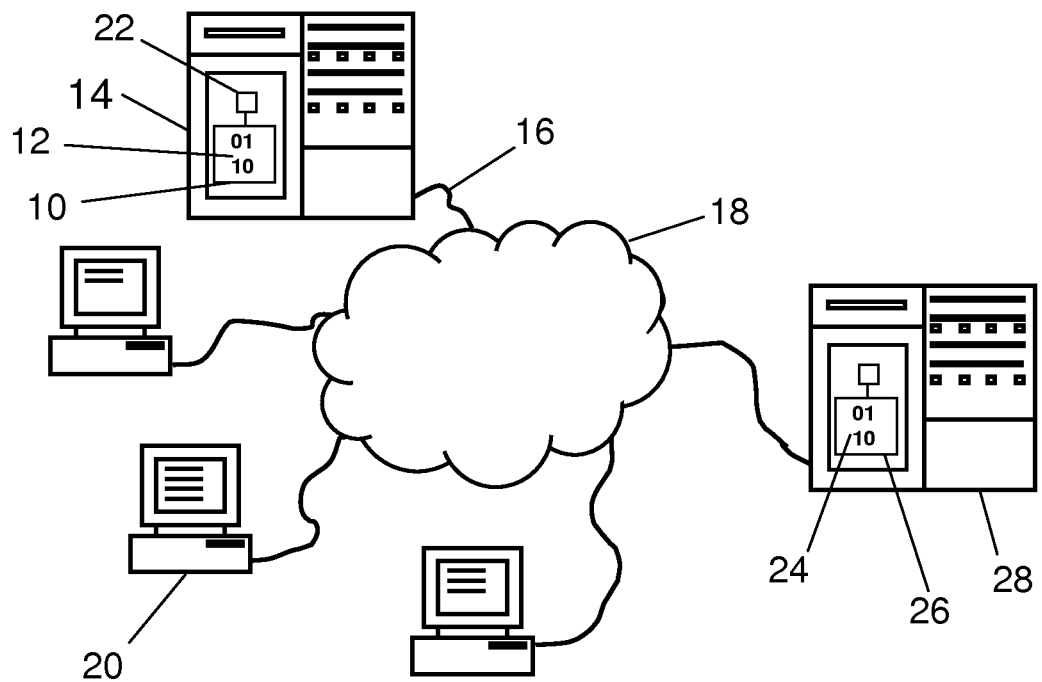
FIG. 1
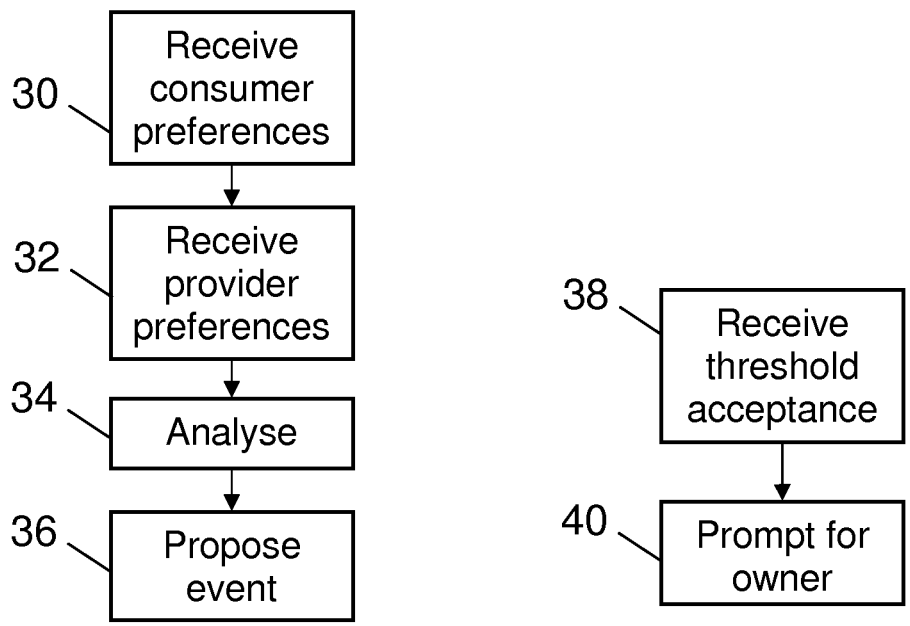
FIG. 2
FIG. 3

INCEPTION OF LIVE EVENTS

TECHNICAL FIELD

The present invention relates to a system and method that captures a latent interest of at least two groups of users for preferred types of event. More particularly, the present invention relates to a system and method that captures users' common preferences and automatically proposes an event based on those preferences, before ownership of the event is established.

BACKGROUND

Each person has a desire for certain live event content. There are known systems and methods used to measure the demand for an event. For example, US Patent Application, publication number US2008/0046913, to Dear discloses a system and method in which an interested party can create a demand for an event at a particular location and then encourage other people to join the demand. Once sufficient demand is shown it provides a communication link to the event provider, including venue owners, so that the system facilitates the scheduling of an event. However, all this system does is enable users to create a demand for a specific event or specific performer in their city and encourage other people to join the demand. The users do not plan the event; they just search for a suitable one and demand it.

US Patent Application to Zrike et al., publication number US2008/0222535, discloses a sports matchmaker system for proposing and accepting sports related events between multiple people.

Another known system is described at the website "Socializr". This is a social network based upon sharing events with friends. Also it may search for other similar online profiles and aggregate them.

Another event search website is "Zvents" that enables easy searches for events in a particular location.

"Upcoming" is an events database and calendar that includes information about upcoming events in which every event is tagged with location and enables users to view events in their neighborhood and to browse events by interest.

"GoLark" is a website that facilitates event seekers and sharers to submit events and vote the best towards the top of the list.

The website "Madtown Lounge" provides a database of bands, venues and concerts and syndicates its data through "Facebook", "Twitter", "MySpace" etc.

"EventOrb" is a social network system for finding, managing and promoting events on the internet that also allows other users to rate events they have attended.

The website "ShowClix" is an event search engine and online ticketing provider that connects artists, venues and event promoters with people all around the world that are seeking local events.

"Trig" is a networking site which allows users to create and attend events but does not allow them to do ticket sales, promotions, etc.

The website "Tourfilter" allows users to receive an e-mail on when their favorite bands come to town using a community calendar.

it is an insight by the inventor herein that none of the systems and methods described above allow consumers to create personal or even unique parameters, which are then aggregated into content interest accumulations that are matched with the parameters of content providers and venues in order to trigger the creation and determination of ownership of the event.

The foregoing examples of the prior art and the limitations related thereto are intended to be illustrative only and not exclusive. Other limitations of the prior art will become apparent upon reading the specification and study of the drawings.

SUMMARY

The present invention facilitates the creation of an event, such as a live event that may involve a group of consumers, a venue and an entertainer (content provider). As an example, common interests of at least two different groups of users, such as content consumers and content providers, are captured and analyzed for overlap and complementary interests. When there is enough of a match between the interests of the two groups the system creates the inception of an event by transmitting a proposal for the event to the members of the groups.

Other groups of users may be venue providers, equipment providers and/or other service providers. Once a certain aggregated interest has been identified and an event proposed, ownership of the event may be prompted for.

In one aspect, the present invention provides a system for capturing latent parameters of interest of at least two groups of users to facilitate creation of an event comprising: a computer-readable medium; a processor in a server; a first group of terminals remote from and connected to said server; a second group of terminals remote from and connected to said server, and computer-readable instructions residing in said computer readable medium for processing by said processor, the system being configured to: receive, via the first group of terminals, a first subset of data, said subset of data comprising one or more parameters of interest of each member of a first group of users; receive, via the second group of terminals, at least one additional subset of data comprising one or more parameters of interest of each member of a second group of users, said second group of users being different to the first group of users; analyze said first subset of data to identify an aggregate of corresponding parameters of interest of said first group of users; analyze the aggregate of corresponding parameters of said first group of users and the parameters of interest of said second group of users to identify complementary parameters of interest of said at least two group of users; and create a proposal for an event based on said identified complementary parameters of said at least two group of users.

In another aspect, the present invention provides a method for capturing latent parameters of interest of at least two groups of users to facilitate creation of an event, the method comprising the following steps performed by a processor: receiving a first subset of data, said subset of data comprising one or more parameters of interest of each member of a first group of users; receiving at least one additional subset of data comprising one or more parameters of interest of each member of a second group of users, said second group of users being different to the first group of users; analyzing said first subset of data to identify an aggregate of corresponding parameters of interest of said first group of users; analyzing said aggregated parameters of said first group of users and the parameters of interest of said second group of users to identify complementary parameters of interest of said at least two group of users; and transmitting, to said at least two group of users, a proposal for an event based on said identified complementary parameters of said at least two group of users.

In a further aspect, the present invention provides computer-readable medium comprising computer-readable instructions, which, when for processed by a processor, cause the processor to: receive a first subset of data, said subset of data comprising one or more parameters of interest of each member of a first group of users; receive at least one additional subset of data comprising one or more parameters of interest of each member of a second group of users, said second group of users being different to the first group of users; analyze said first subset of data to identify an aggregate of corresponding parameters of interest of said first group of users; analyze the aggregate of corresponding parameters of said first group of users and the parameters of interest of said second group of users to identify complementary parameters of interest of said at least two group of users; and create a proposal for an event based on said identified complementary parameters of said at least two group of users.

In addition to the exemplary aspects and embodiments described above, further aspects and embodiments will become apparent by reference to the drawings and study of the following detailed description.

BRIEF DESCRIPTION OF THE DRAWINGS

In the following detailed description, reference will be made to the attached drawings in which:

FIG. 1 is a block diagram of a system for capturing latent interest according to an embodiment of the invention.

FIG. 2 is a block diagram schematically depicting a method for capturing a latent interest and providing the inception of an event.

FIG. 3 is a block diagram schematically depicting a method for prompting for ownership of an event.

GLOSSARY

Figure 4:
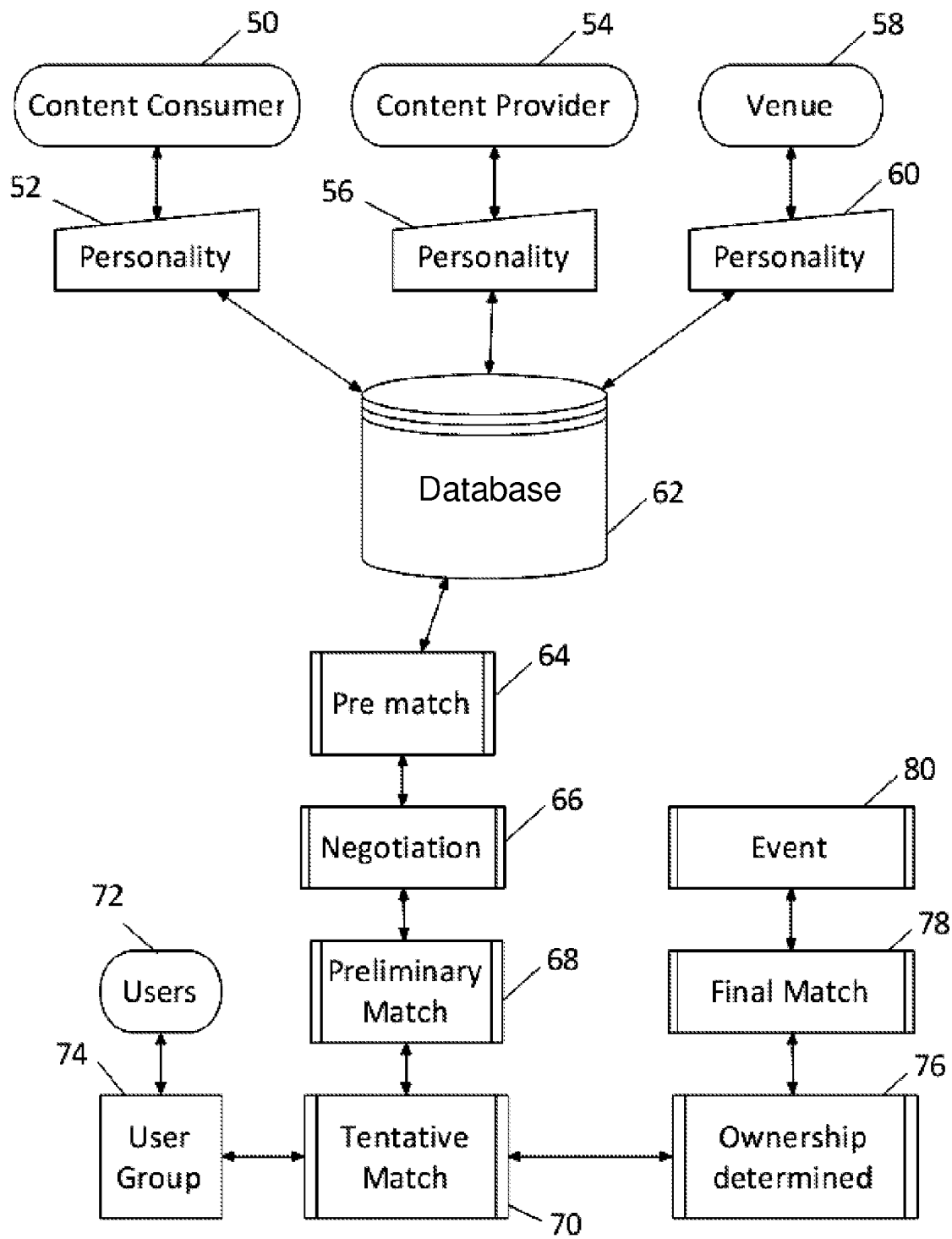
FIG. 4 is a block diagram schematically depicting a more detailed method for capturing a latent interest and providing inception of an event.

Content consumer: A user of the system who is typically a member of the public.

Content interest personality: Data that reflects the interests, profile, preferences, parameters or characteristics of a content consumer. May be referred to as content interest parameters or content interest characteristics.

Content interest accumulation: a quantity of similar traits in a group of content interest personalities, stored in a database.

Content provider: A person, band or team of people that provides entertainment or other content to the public.

Preliminary match: A result calculated by the system to indicate that there is enough potential interest for the inception of an event.

Tentative match: Occurs when a minimum number of people have provisionally agreed to attend a proposed event.

Final match: Ownership of an event has been decided and details are firmed up.

DETAILED DESCRIPTION

Each person (content consumer) has desires for certain live event content. These desires form a personal set of live event content interest characteristics, which we will call a content interest personality. The content interest personality may be dynamic, changing with time, mood, age, life situation, social trends, etc. Each content interest personality may be unique in itself, but has commonalities with other people's content interest personalities. The commonalities between content interest personalities form content interest accumulations, which would not be apparent without a method and system to identify and aggregate them.

Within the plurality of content interest personalities, there exists, at certain times, enough accumulated content interest to satisfy the prerequisite parameters for forming a live event. Content providers and venues also have personalities (similar to content interest personalities) and/or parameters. By identifying content interest accumulations and matching them with the personalities and parameters of content providers and/or venues, it is possible to create live events that would not have been created without the invention.

The present invention is a system for capturing latent interest for an undefined (i.e. not yet proposed) event by identifying content interest accumulations from a plurality of content interest personalities. These content interest accumulations are aggregated and matched to live event creation parameters.

Once a content interest accumulation is identified and aggregated, an iterative negotiation of the content interest parameters, content provider parameters, venue parameters, and/or other live event creation conditions is commenced. When overall content consumer interest has matched the conditions or complements the interests of content providers, a preliminary and then a tentative match may be made. A tentative match then triggers the creation of the event, by prompting for its ownership through a bidding, volunteer, nomination, voting or other process, and facilitates the formation of a user group, which leads to a final match and ultimately a live event.

FIG. 1 illustrates a system according to an embodiment of the invention. The system comprises a computer-readable medium 10 on which a series of computer-readable statements and instructions 12 are stored in the form of a program. The computer-readable medium is contained within a server 14 which is connected with a data carrying communication link 16 to a network 18. Users of the system connect to the network via input device 20, such as a personal computer, a terminal, a mobile phone, a telephone, a wireless email device, cable/satellite boxes or any other device with sufficient memory and connectivity to be able to communicate with other units of the system. The one or more input devices 20 are used by one or more content consumers to create their unique content interest personalities. At the same time, one or more input devices 20 are used by other users such as content providers, venue providers, service providers etc. to provide their own personalities and parameters. The input device 20 can be remote from the server and can provide input of information and display output from the program. The output is produced by a processor 22 within the same or different server or elsewhere which acts on the computer-readable instructions and the inputs and information provided by the users. An additional database of computer-readable information 24 on a computer-readable medium 26 is optionally provided in a server 28, the same server 14 or elsewhere, the information being accessible by the program. A plurality of such databases may be provided for different types of data storage, or the different types of data may be stored in different tables within the same database. The program is written using known in the art methodology in one or more common computer programming languages known in the art such as C++, PHP, MySQL, HTML, AJAX, Java, SQL, Javascript, SSE, ASP or any other known computer programming language in any version or variation of these and the output can be presented to the user in the format of web pages, for example on a user screen, a print, a file, email or any other known form for presenting information. Data may be presented as SMS text messages, for example. The network 18 may be the internet, a telecommunications network, or a combination of the internet and a telecommunications network.

FIG. 2 schematically shows, in terms of a flowchart, an example of a method for capturing latent interest and providing the inception of an event. In step 30, the system receives preferences from content consumers. This may be achieved via a group of terminals, such as electronic communication devices, and a network. The data may include one or more parameters of interest of each content consumer. In step 32, the system receives preferences from content providers. This may also be achieved via one or more terminals connected to a network. The data may include one or more parameters of interest of each content provider. In step 34, the received data is analyzed to identify an aggregate of corresponding parameters of interest of the content consumers, which is analyzed in relation to the parameters of interest of the content providers to identify corresponding or complementary parameters of interest between the consumers and providers. In step 36, a proposal for an event is created based on the identified, complementary, parameters of interest of the consumers and providers.

FIG. 3 schematically shows, in terms of a flowchart, further steps in the above method. In step 38, after an event has been proposed to the content consumers and content provider(s), the system accepts, via the terminals, inputs indicating provisional acceptance of the proposal. The system counts the number of acceptances and determines that at least a predetermined number of provisional acceptances have been received. Once the acceptance threshold has been reached or exceeded, the system in step 40 sends messages to the consumers, provider(s) and members of any other interested group, prompting for ownership of the event.

FIG. 4 schematically shows, in terms of a flowchart/state diagram, a method for capturing latent interest that is performed by a system of the present invention. Content consumers 50 having data representing content consumer personalities 52 interact with the system. Content providers 54 data representing content provider personalities 56 also interact with the system. Venue providers, owners or managers 58 data representing venue personalities 60 also interact with the system. The content consumers 50 from a group, as do the content providers 54 and the venue providers 58. It should be understand though that there could be more or less than these three groups, for example, a service provider group such as stage gear provider, a travel provider group, a caterer group, an event manager group etc. may be added. The system receives from each of these groups the input of a subset of data 52, 56, 60 which is then fed to a database 62 through a data carrying communication link such as the internet, a telephone network, optical cable or any other communication link that permits transfer of data from one site to another remote site. Each of these subsets of data may comprise personal data, parameters and/or preferences of each user of the relevant subset group of users such as content consumers, content providers and venue providers. Specifically, the system receives content consumer data 52 which includes personal content interest characteristics and preferences of each consumer user of the method. At the same time, the system receives content provider data 56 and venue data 60 from content providers and venue providers respectively with their own personalities and parameters. Data received is provided by the system to the database 62.

When inputting data, users can select from predefined preferences or can add their own unique personalities and parameters. The user can select the type of event, location, time, venue, performer etc. The event may include various different activities including, but not limited to, musical concerts, sporting events, speeches, tourism and travel, political groups, charity and fundraising, book readings, lectures, film or video shows, gatherings of a particular group of people interested in a particular subject and any other activities. The users can express their general interest, for example, in themes such as jazz, hockey, mystery books etc. The system may also be configured to allow users to specify their interest in a particular performer. The input can be made via a website that implements this invention, or via the website of a content provider, a venue provider or other associated business; from any of the content provider's web content, such as songs, books, articles, news broadcasts, advertisements, etc.; from any social networks such as Facebook, Twitter etc.; or from any other content providers such as Youtube. This may be done via a button or other link that is added to such sites.

The content interest personality may be dynamic and may change with time, mood, age, life situation, social trends, etc. Each content interest personality may be unique in itself, but generally has commonalities with other content interest personalities. The content interest personality from each consumer is analyzed to find any common content interest personality. The identified aggregate of common content interest personalities form consumer content interest accumulations.

In addition, each of the content providers and venue providers provide their own personality and parameters such as type of event, size, location, time, day(s) of the week etc. The data from the content provider and venue provider can be provided to the same database 62 or to a different or multiple databases, each of these databases being in communication with the processor 22. Before a match is made, in the pre-match phase 64, the system performs certain analyses. The system analyzes the aggregate content interest accumulations from the consumer subset 52 and will attempt to match them with the personalities and parameters of content providers and venues. If a match is found, using algorithms encoded in the computer readable instructions, between the consumer content interest accumulations and the provider's and/or venue's personality and parameters then there is a preliminary match 68 for creating a live event. A preliminary match may be an exact match, a partial match or an approximate match. If there is no match, the system will reiterate the analysis process until a new refined aggregate content interest accumulation is identified and then match it with the personalities and parameters of content providers and venues. During the reiteration process, the constraints within the algorithm may be relaxed, or the system may wait for new input from either new or existing users. For example, if no matches can be found for an existing set of users, then parameters in the algorithm(s) may be changed such that at least a partial or approximate match is made.

In another embodiment of the present invention, the personality and parameters from each content provider and/or for each venue are analyzed to find any common personality/parameters and to identify an aggregate of common personality/parameters between different content providers and/or venues. One or more content providers may provide content at the same event.

Before there is a match, in the pre-match phase 64, an iterative negotiation 66 of the content interest parameters, content provider parameters, venue parameters, and perhaps other live event creation conditions begins. During the negotiation phase 66, the parameters can be adjusted by the respective owner of the parameters and each user can participate in the negotiation phase for making further decisions. When content interest accumulation has matched the conditions of content providers, a preliminary match 68 is made. For example, the system can be set up to require 50-66% critical mass in order to have a preliminary match. This means that at least 50% of the consumers should have content interest personalities corresponding to such an event. In some cases, consumers may be able to specify that they would be open to events other than those they have provided a precise interest in. Also, the preliminary match threshold can be increased or decreased. Following this, the system notifies all users from the matched consumer, provider and venue subsets that there is a possibility for an event.

The preliminary match could result in an output such as: Jazz Piano Evening by Mr Jazz & Co at the Jazzy Beer Cellar at 7:30-9:30 on Thursday 1 Jul. 2010. That is, the outputs may be of the form: Type of event; Provider; Venue; Time; Date. Some of the output could be given as a range, or a choice of one or more options to be later decided upon.

The system may automatically request all users to confirm their interest in the proposed event, or one or more of several proposed events, in order to result in a tentative match 70. Another way to create a tentative match 70 is to invite the users 72 that have been preliminarily matched to a user group 74 that is formed at the tentative match stage.

For example, the system can be set up to require a 75% confirmation level in order to complete a tentative match. This means that 75% of the consumers need to confirm their interest in order to have a tentative match. Also, the threshold can be increased or decreased. Before or after there is a tentative match 70 that has been decided upon by the users in the user group, an ownership of the event is prompted for and determined 76. Once the ownership has been confirmed in state 76, the content provider, venue, website, event manager and/or any other provider such as transport provider, caterer etc. may be confirmed. This may be done via the user group 74. The user group 74 includes any user that communicates with the other users in order to determine the ownership of the event, or the content, or the location, or any other issue related to the event. The decision about the ownership is made by the users by voting, bidding or volunteering. The owner can be any of the users or an independent event manager. Once the ownership of the event is determined a final match 78 is made. In this state, payments and guarantees are made. This effectively triggers the creation of an event 80. The event can be any live event such as concert or performance, or it can be a TV broadcasting or conference call etc.

In some embodiments it may be the case that negotiation phase 66 is omitted, or present but not always necessary. This phase may be a simple check on whether there is a match or not, and if there is, a preliminary match is made. In another embodiment, the preliminary match phase 68 may also be omitted and the system may proceed directly to the tentative match phase which will be then confirmed by commitment of the users involved in the user groups.

According to some embodiments of the invention, once content interest accumulations from the content consumer personality data 52 are identified, invitations to content providers and/or venue providers not currently present in the system may be sent to encourage them to become content providers and/or venue providers.

In another embodiment of the invention, all users can send invitations to other members of the public such as friends, or other content or service providers, or other venue providers or any other member of the public or business to join and be included in the database or to join a certain event.

Figure 5:
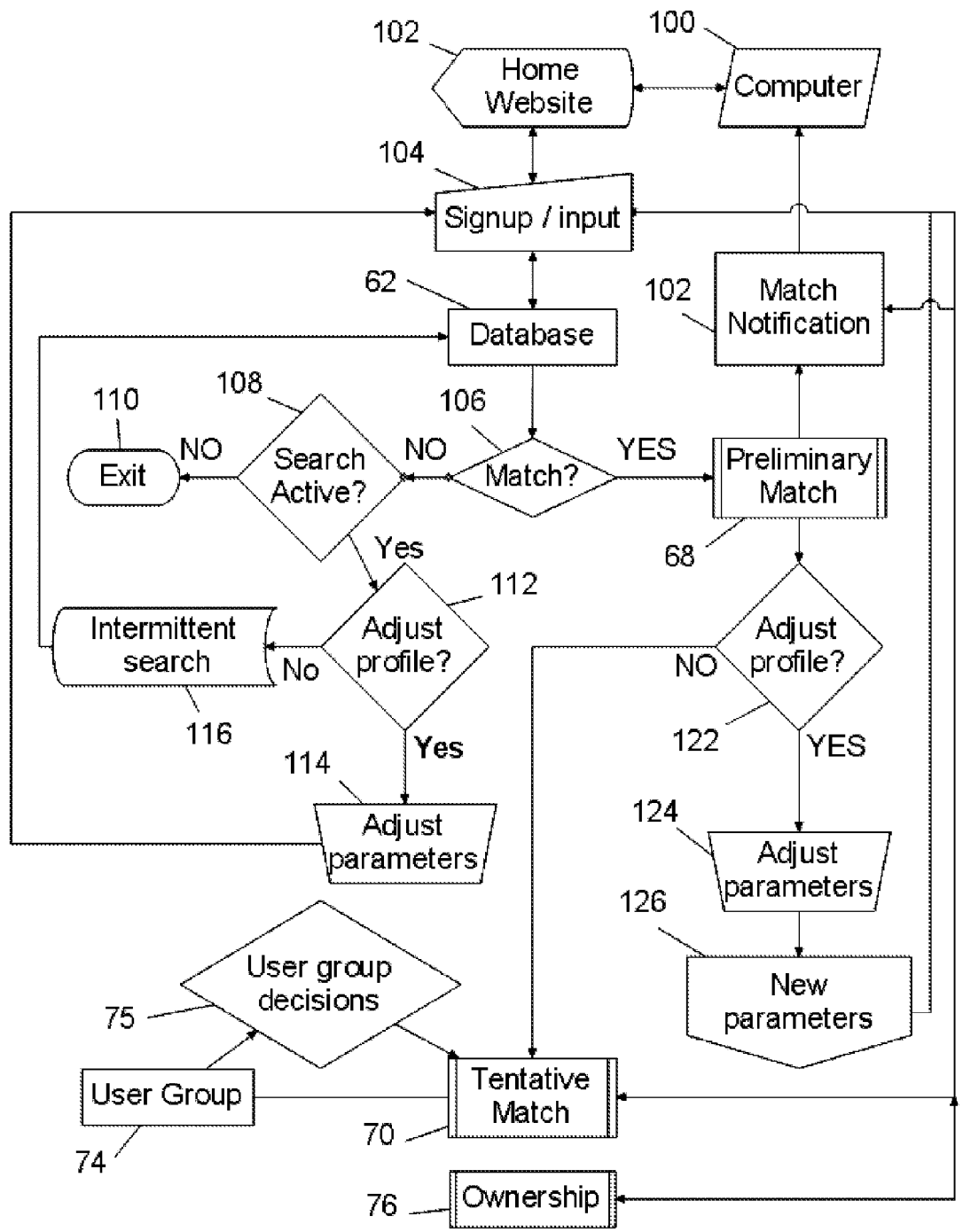
FIG. 5 is a block diagram of a provider flow.

FIG. 5 shows a flowchart of the method in relation to a content provider. A provider, such as a content provider or a venue provider or any other service provider, can use a computer, smartphone or other electronic processing device 100 to access a website 102 for example, the home website, and sign up and input 104 a provider profile such as a personality and parameters profile. Then the system will search through the database 62 and compare 106 consumers' profiles, providers' profiles and or parameters of venues in order to determine whether there are any matches. The comparison may be made using one or more predetermined threshold levels. In the case that there is no match, the provider may be prompted 108 as to whether or not to leave the search active. If not, then the system will exit 110. If, however, the system receives an indication that the provider would like to leave the search active, the system may further prompt 112 the provider as to whether his or her profile should be changed. If so, the provider can return back and input 114 trial or newly adjusted personality and/or parameters, these temporary trial parameters being sent back to the database 62 from where they can be retrieved for analysis. If no adjustment of the search parameters is desired, the system may intermittently do a new search 116 using the parameters already supplied to try again to find a match.

When the system finds a match, it is identified as preliminary match 68 and the provider's computer or device 100 is sent a notification 102. The provider may be prompted 122 to adjust his or her profile. If content interest parameters are in sufficient agreement with content provider parameters then no need for further adjustment of the provider profile is necessary. In such case a tentative match state 70 is entered. In case the match between content interest parameters and content provider parameters is not acceptable, or if the provider wants to adjust his or her parameters, then further negotiation and adjustment 124 of provider parameters is required. The new parameters 126 are input into the database 62 via the home website 102 and the search for a match is repeated.

At the start of or during the tentative match state 70, a user group 74 is formed and the system notifies all users in the user group that there is a possibility for an event and asks to confirm preliminary attendance and preferred time. The user group 74 includes any user, such as a consumer, content provider, venue provider or service provider that communicates with the other group users/providers/venue providers in order to make decisions 75 on the event content, event ownership and other providers, for example. Any tentative match information is conveyed to the database 62 and at the same time any information from the database 62 is transmitted to the tentative match state 70. So, there is a bidirectional communication between the tentative match state 70 and the database 62. During the tentative match state a time is confirmed as well as preliminary attendance figures. After the tentative match state 70, and provided an owner has been determined, the system proceeds to the ownership determined state 76 where final details are arranged, such as sending a contract via the system to the provider's device or computer 100. Final details are fed back into the database 62 so that data regarding created events can be used later by the algorithms used to form preliminary matches. For example, if an actual event of a certain type is found to be poorly attended, then in the future, the threshold for generating a preliminary match for such an event can be increased. The feedback of real data and the way it is used can become complex, as one skilled in the art will realize.

As part of a web presentation and to make it user friendly, a social game may be created which uses a map with a representation of the various events in each stage of development. It may be a game within a social network or it may be accessed from outside a social network. It may be configured so that one could invite friends and give tickets away, and the event formation nodes would need to be tended with due care and attention. This would be after the tentative stage.

Figure 6:
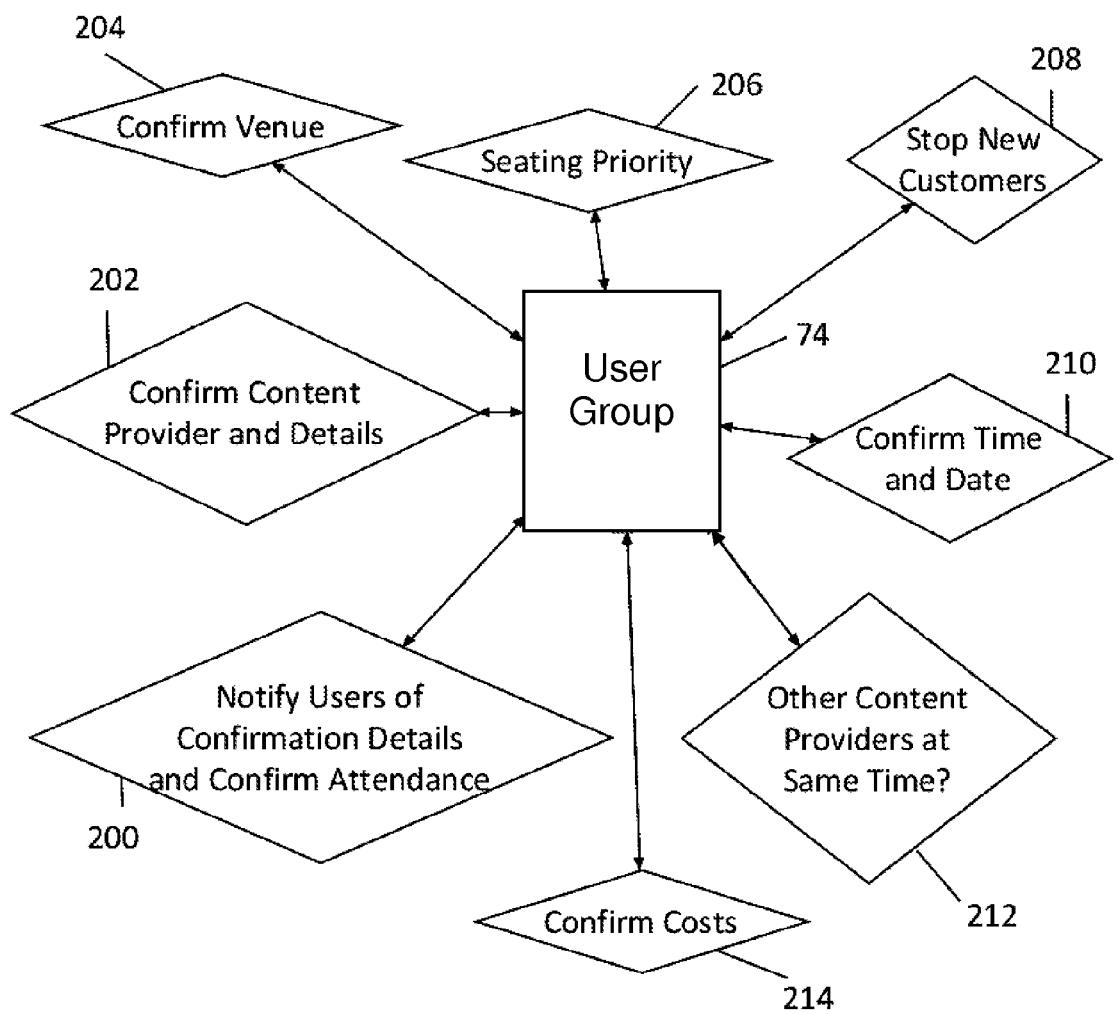
FIG. 6 is a block diagram depicting user group decisions.

FIG. 6 exemplifies the decisions and discussions made within a user group 74. All users matched are notified of the user group. First a decision regarding the ownership of the event should be made and the owner should be determined. Users may confirm 200 acceptance to attend the event. Each user can also be an owner of the event. The decision is made by voting, bidding or volunteering. Each decision is communicated and confirmed between all users or all interested users within the user group. Other decisions discussed and made by users may include but are not limited to, content details 202, venue confirmation 204, seating priority 206, stopping new consumers 208, time and date 210 of the event, inclusion of other content providers 212 at the event, confirmation of costs 214, etc.

Figure 7:
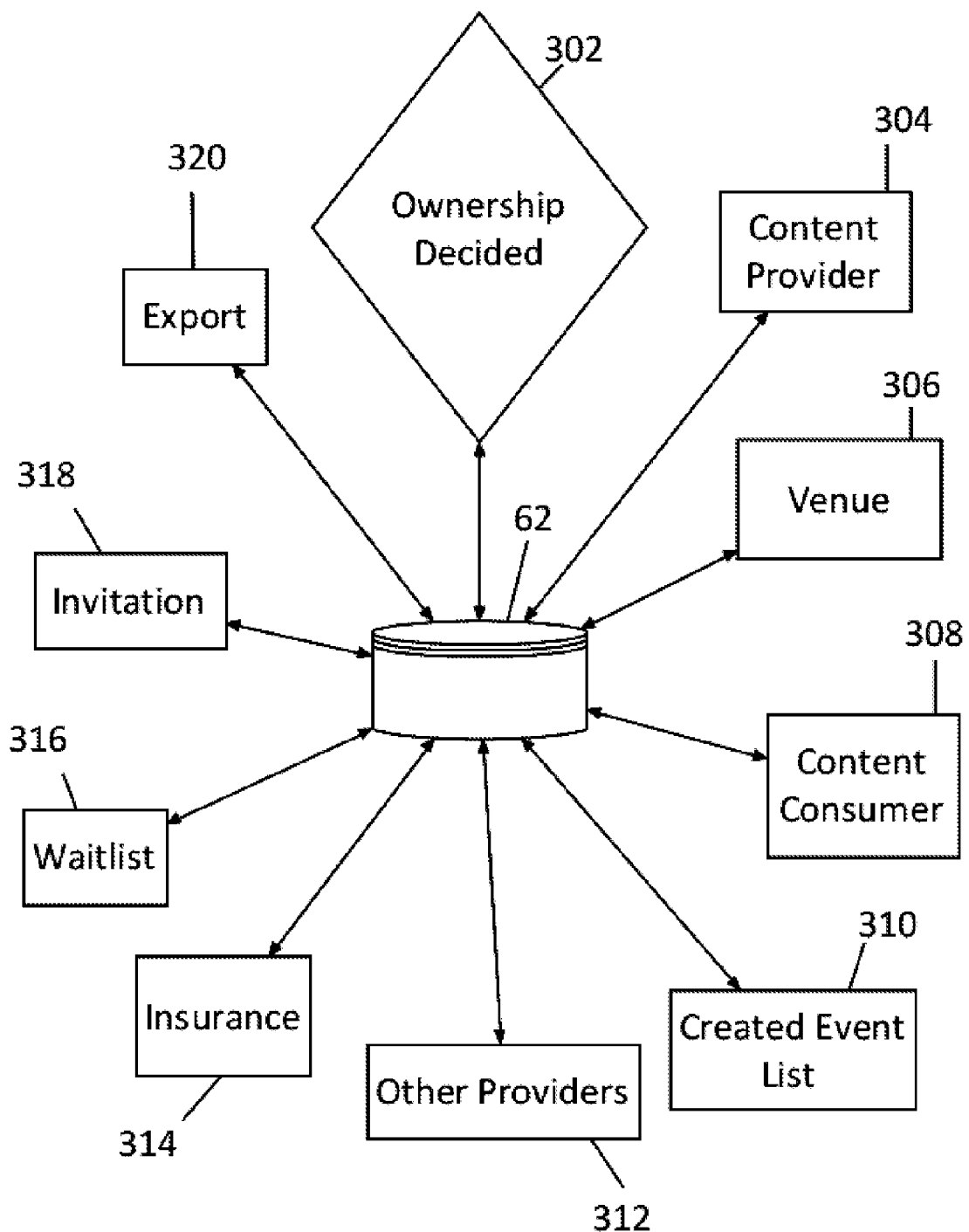
FIG. 7 is a block diagram showing final match interactions with the database.

FIG. 7 shows the final match interaction with database 62 in accordance to the present invention. The communication between the users and the database goes in both directions, from database to users, and reverse from users to database, using the processor 22. Each of the users provides input information in the database but also can search and obtain information from the database. For example, an event owner provides information 302 to database 62 related to the content provider, content, location, size, venue, provider, user group, home website, event manager etc. and obtains information back from the database regarding seating, tickets, invitations, confirmation and guarantees from consumers, content provider, venue etc. Content provider 304, venue provider 306, consumer 308 and/or other service providers 312 provide confirmation and guarantees regarding the content, tickets and seating priority, location, time, date, size of the event but also can obtain information from the final match database 62. Content consumers at 308 may buy and be provided with tickets, and provide ID. Seating priority may be allocated to content consumers in order of sign-up, for example. Other information that is communicated to and from the final match database 62 includes but is not limited to a created event list 310, insurance 314 for the event, waitlist 316 in case of full events, invitations 318 to other members of the public if room is available, for consumers to be notified if cancellations happen in full events, export information 320 such as event particulars and map to calendars and social networks, etc.

Figure 8:
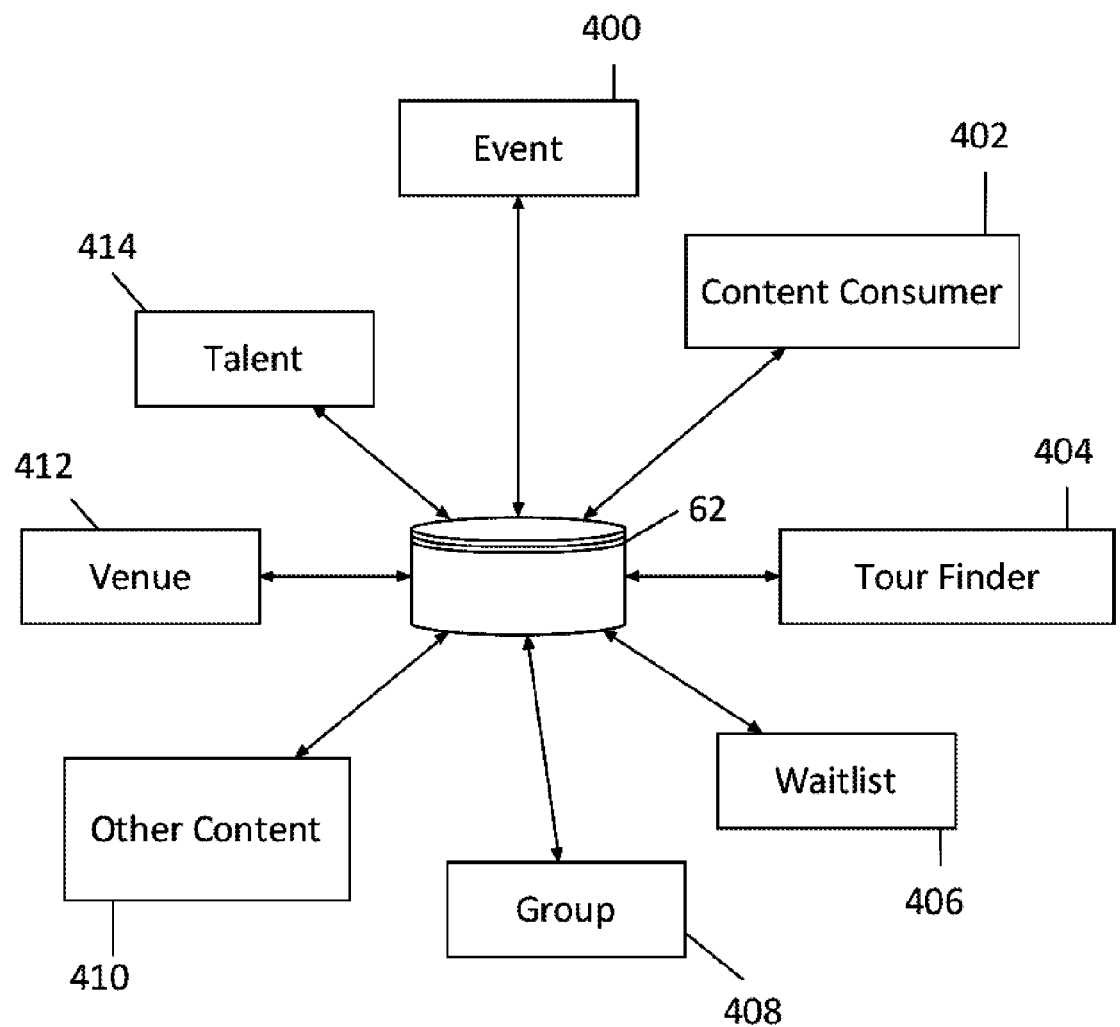
FIG. 8 is a block diagram showing search functions.

FIG. 8 illustrates the search functions available through the database 62 according to an embodiment of the invention. These search functions are available to the users but also to any member of the public interested in some event. For example, all users by accessing the home website can search 400 for any event by location, time, content, provider, size, personality or key word. In addition the system provides a search function 402 for consumer content search by content type, geographic area, group size and/or personality. This search function can be used by providers to discover what kind of event an audience is interested in. The database can be also used as a tour finder search 404, or a waitlist search 406 for events that are full. Group search 408 may be used to find groups of content consumers, by size of group, interest of the group members and/or the geographic area of the group. It may be used by other service providers 410 such as a stage gear provider, caterer, event manager, travel agent etc. to see what kind of events will occur in their geographic area; or for finding particular content providers and/or content consumers. It may be used as a venue search 412, enabling search by size, date, time, feature and/or venue personality. The system also provides a search for talent or content providers 414 by geographic area, content type and/or by personality.

Personality

The system quantifies user preferences, interests, and availability in a collective way referred to as a personality. In a possible embodiment, a series of parameters describing said personality, all of which can be placed on a numeric scale between two extremes, are identified. As the user profile is created and updated, these values are adjusted accordingly. For example, in music preferences, a live music consumer may prefer rhythm-driven songs over melody-driven songs, slow tempos over fast, and certain levels of harmonic complexity. Similarly, live music providers (bands) can provide songs in that spectrum. The particular parameters will vary according to content type but it is possible to store all values for a user, given the availability of computer storage.

There could be, for example, as many as 200 numbers in a personality, or just a few, or any other number. Values may only be present for some of the numbers. By representing personalities this way, algorithms used in computer programs can mine data or perform other operations on the personalities. Masks or filters can be used if only some of the data needs to be accessed. Search engines could use a person's personality for tailoring or weighting search results according to the person's interests, or even according to the averaged interests of numerous people with similar personality traits.

Political interest or career interest could also be included in a numerical personality.

In another possible embodiment, the personality of a particular user can be captured as a variable-length string of characters.

The exact value of the personality for a particular user can be adjusted in a number of ways. The user can answer a series of questions with a limited number of responses, each of which is associated with certain personality traits (i.e. preferences and interests). For example, the user may be asked on a scale of 1 to 4, the importance of lyrics in their music. The user may also make reference to known personalities as exemplifying their style (in the case of a content provider) or taste (in the case of content consumer). For example, the user may be asked to provide bands which are similar to their style or taste. The user may also be asked to rate previous live events they have been involved in, thereby quantifying their interests. They may also be given opportunity to rate samples of live content available on the main website or content provider websites. It is also possible to gauge user preferences by passive user participation, tracking which content providers they research through the website, and how long they stay on a given page.

Individual users could be led through a fun program to build such personalities. For example, a painting or an avatar could be built as the personality is being created. An avatar could have a favorite song that represents the musical taste of the owner of the avatar.

Certain parts of a numerical personality may be derived from other data within the personality.

Furthermore, it is possible to adjust these parameters in strictly deterministic and non-deterministic ways. For a given response or user input, the values of their preference can be adjusted according to exact, static values (+1 for parameter A, 0 for parameter B, −4 for parameter C) etc. The responses would then be averaged into a single value. However, it is possible to assign probabilities to the user preferences for each response to each question. The user personality values would be viewed probabilistically and new information incorporated using Bayesian inference. i.e.

$$P(V \mid R) = \frac{P(R \mid V)P(V)}{P(R)},$$

where P is probability, V is the hypothesis that the users preference value is X, and R is the response from the user. Initially, P(V) would be simply be 1/M, where M is the number of possible values X, and P(R) would be simply be 1/N, where N is the number of possible responses.

It is possible to carry this idea further and employ hidden Markov models to come up with a most likely personality profile, given a series of user responses. This requires viewing the parameters as states with equal probability of transition. This could more easily allow a given response to affect multiple parameters of the personality. Statistical estimators such as the minimum mean squared error and maximum likelihood estimator may also be used.

Venues and performers can each have numerical personalities. A venue's numerical personality would be based on capacity, type of event preferred to be held by management, preferred times or dates for performances etc.

A preferred embodiment for the personality might use a taxonomic system of classification for human activities. This classification system would specialize in human social activity and provide a standard tool to use in creating the personality. With a combination of a taxonomic system and personality tests each person would have a unique identifier.

This identifier would be a valuable social tool which could be linked to the QR codes or other scannable code systems to provide a mobile search and filter tool to identify real world events and content tailored to the persons unique interest identity. One could call the number UIN—universal interest number.

Match Generation

A very simple example of an algorithm that could be used for determining a preliminary match may be: IF (10 people are interested in an event of style X) AND (a provider is willing to provide style X for 10 to 20 people) THEN (create preliminary match).

In a simpler embodiment, content consumers are considered interested in a certain content provider if they have explicitly stated their interest in said content or all content belonging to a certain type. The consumers are considered available if they have explicitly stated their availability on certain dates/times. In this manner, a tally of all possible consumers for a particular event at a particular time can be calculated.

In a more complex embodiment of the device, users who have not explicitly stated interest in a particular event or presentation of live content can be assigned a probability of interest based on a comparison of their personality profile to that of the content provider. For the embodiment wherein the personality profile is stored as a series of numerical values, a simpler calculation would be the sum of squared difference between the consumer and provider personalities $$\sum_{i=1}^{N} (C_i - P_i)^2$$

for N parameters, consumer personality C and provider personality P. A more complex calculation would examine the statistical correlation between the consumer and producer profiles relative to the mean profile of all users in the database. The user schedule availability, if not explicitly stated can be assigned a probability based on previous attendance or general average attendance system-wide. The user's willingness to travel to a proposed venue can also be calculated based on their travel history, recorded travel preferences, and distance from their current location.

Once all of these probabilities are calculated, the expected attendance for a particular event at a particular date/time and a particular venue can be calculated as $$\sum_{i=1}^{N} I_i \cdot A_i \cdot T_i,$$

for N consumers in the system. I is the probability that the user is interested in the event, A the probability that the user is available at the proposed time, and T the probability that the user is willing to travel to the venue. Note that the probabilities are not multiplied by a value for that probability since the consumer counts as an attendance of 1. However, if user groups are taken into account, the expected attendance would be $$\sum_{i=1}^{N} I_i \cdot A_i \cdot T_i + \sum_{i=1}^{M} S_i \cdot I_i \cdot A_i \cdot T_i$$

for M user groups of size S each. The system of the present invention may also be configured to allow users to have a specific group function such as a "flash mob" function as one of their preferences. The system will then automatically average the personalities of the individuals into a group personality. In such case the ownership of the event may be determined closer to the beginning of the process.

The present invention can also be used for creating events such as creating a political party based on a unique characteristics and preferences of a certain user group. The focus will be to have an independent candidate in each riding responsive to the constituents and not a political party. Another area of application is in the travel industry, and for sports, education, spirituality etc. for identifying common interest of one group of users and matching it with the personalities and parameters of content providers and venues or triggering creation of new providers and/or venues to meet the identified common interest of the user group. Creation of larger groups would give the users buying power.

In another embodiment of the present invention, the system may average the personalities of a plurality of users within a user group to create subgroup personalities within the group, for example the system could identify a user subgroup within the consumer subset 50 that are generally attending similar events. Once the system creates the subgroup personalities, they could be identified and accessible as part of a user group profile.

Where percentages are given, other percentages could be used in different embodiments, according to the results and performance desired. Steps of the method may be performed in a different order to that shown herein, and some may be omitted.

While preferred embodiments of the present invention are shown and described, it is envisioned that those skilled in the art may devise further various modifications of the present invention without departing from its scope.

Industrial Applicability

It has been shown that the present invention can propose an event that otherwise may not have taken place, providing commercial benefits to performers and other content providers as well as to venue and other service providers. By automatically proposing events, considerable pre-event preparatory work is accomplished before the owner of the event becomes involved, resulting in both increased efficiency in event organization as well as reduced marketing requirements.

What is claimed is:

1. A system for capturing latent parameters of interest of at least two groups of users to facilitate creation of an event comprising:
   a computer-readable medium;
   a processor in a server;
   a first group of terminals remote from and connected to said server;
   a second group of terminals remote from and connected to said server, and
   computer-readable instructions residing in said computer readable medium for processing by said processor, the system being configured to:
      receive, via the first group of terminals, a first subset of data, said subset of data comprising one or more parameters of interest of each member of a first group of users;
      receive, via the second group of terminals, at least one additional subset of data comprising one or more parameters of interest of each member of a second group of users, said second group of users being different to the first group of users;
      analyze, by the processor, said first subset of data to identify an aggregate of corresponding parameters of interest of said first group of users;
      analyze, by the processor, the aggregate of corresponding parameters of said first group of users and the parameters of interest of said second group of users to identify complementary parameters of interest of said at least two groups of users; and
      create, by the processor, a proposal for an event based on said identified complementary parameters of said at least two groups of users;
   wherein each member of the first group is a content consumer and each member of the second group is a content provider.

2. The system according to claim 1 further configured to transmit said proposal to the first and second groups of terminals.

3. The system according to claim 2 further configured to receive, via first and second groups of terminals, inputs indicating provisional acceptance of the proposal.

4. The system according to claim 3 further configured to:
   determine that at least a threshold number of provisional acceptances have been received; and
   prompt for ownership of the event.

5. The system according to claim 3 further configured to create a user group.

6. The system according to claim 1 configured to vary a threshold used for identifying the aggregate of corresponding parameters of interest of said first group of users.

7. The system according to claim 1 further configured to:
   receive an adjustment to a parameter of interest; and
   identify adjusted complementary parameters of interest based on said adjusted parameter.

8. The system according to claim 1 further configured to represent the first subset of data as one or more numerical personalities.

9. The system according to claim 8 further configured to derive part of the numerical personality from data representing another part of the numerical personality.

10. The system according to claim 8 further configured to identify a subgroup of numerical personalities and create therefrom a group numerical personality.

11. The system according to claim 1 configured to identify the aggregate of corresponding parameters of interest of said first group of users by assigning a probability to each of said first group of users, where said probability represents one or more of:
   a probability of interest in an event to be proposed;
   a probability of availability for the event to be proposed; and
   a probability of ability to travel to the event to be proposed.

12. The system according to claim 1 wherein said event is for live provision of content provided by one or more members of the second group to one or more members of the first group.

13. A method for capturing latent parameters of interest of at least two groups of users to facilitate creation of an event, the method comprising the following steps performed by a processor:
   receiving a first subset of data, said subset of data comprising one or more parameters of interest of each member of a first group of users;
   receiving at least one additional subset of data comprising one or more parameters of interest of each member of a second group of users, said second group of users being different to the first group of users;
   analyzing said first subset of data to identify an aggregate of corresponding parameters of interest of said first group of users;
   analyzing said aggregated parameters of said first group of users and the parameters of interest of said second group of users to identify complementary parameters of interest of said at least two group of users; and
   transmitting, to said at least two groups of users, a proposal for an event based on said identified complementary parameters of said at least two groups of users;
   wherein each member of the first group is a content consumer and each member of the second group is a content provider.

14. The method according to claim 13 further comprising:
   receiving provisional acceptances of the proposal;
   determining that at least a threshold number of provisional acceptances have been received; and
   prompting for ownership of the event.

15. The method according to claim 14 wherein the first subset of data is represented as one or more numerical personalities.

16. The method according to claim 13 further comprising:
   receiving a further subset of data comprising one or more parameters of interest of each member of a third group of users, said third group of users being different to the first group of users and the second group of users;
   analyzing said aggregated parameters of said first group of users, said parameters of interest of said second group of users and said parameters of interest of said third group of users to identify complementary parameters of interest of said first, second and third groups of users; and transmitting, to said first, second and third groups of users, a proposal for an event based on said identified complementary parameters of said first, second and third groups of users.

17. The method according to claim 16 wherein each member of the third group is a venue provider.

18. A non-transitory computer-readable medium comprising computer-readable instructions, which, when processed by a processor, cause the processor to:
- receive a first subset of data, said subset of data comprising one or more parameters of interest of each member of a first group of users;
- receive at least one additional subset of data comprising one or more parameters of interest of each member of a second group of users, said second group of users being different to the first group of users;
- analyze said first subset of data to identify an aggregate of corresponding parameters of interest of said first group of users;
- analyzing said aggregated parameters of said first group of users and the parameters of interest of said second group of users to identify complementary parameters of interest of said at least two group of users; and
- create a proposal for an event based on said identified complementary parameters of said at least two groups of users;
- wherein each member of the first group is a content consumer and each member of the second group is a content provider.

* * * * *